(12) United States Patent
Steenbergen et al.

(10) Patent No.: US 7,596,069 B2
(45) Date of Patent: Sep. 29, 2009

(54) OPTICAL MEDIUM ALIGNED INFORMATION SYSTEM AND METHOD

(75) Inventors: Christiaan Steenbergen, Austin, TX (US); Ed Beeman, Fort Collins, CO (US); Dirk Erickson, Austin, TX (US); Thomas L. Pratt, Austin, TX (US); Charles Robert Weirauch, Loveland, CO (US)

(73) Assignee: Dell Products L.P., Round Rock, TX (US)

( * ) Notice: Subject to any disclaimer, the term of this patent is extended or adjusted under 35 U.S.C. 154(b) by 1285 days.

(21) Appl. No.: 10/722,268

(22) Filed: Nov. 25, 2003

(65) Prior Publication Data

US 2005/0111326 A1 May 26, 2005

(51) Int. Cl.
*G11B 7/00* (2006.01)
(52) U.S. Cl. .................. 369/59.23; 369/53.22; 369/94; 369/52.1; 369/53.21
(58) Field of Classification Search ........................ None
See application file for complete search history.

(56) References Cited

U.S. PATENT DOCUMENTS

| | | | |
|---|---|---|---|
| 6,278,671 B1 * | 8/2001 | Gotoh et al. ............. 369/47.19 |
| 6,366,542 B1 | 4/2002 | Kojima et al. ............. 369/44.23 |
| 6,501,712 B1 | 12/2002 | Masuda et al. ........... 369/44.27 |
| 6,852,383 B2 * | 2/2005 | Sako et al. ................. 428/64.1 |
| 6,977,880 B2 * | 12/2005 | Tomita ..................... 369/59.16 |
| 7,031,246 B2 * | 4/2006 | Sako et al. ............... 369/59.25 |
| 7,039,848 B2 * | 5/2006 | Inokuchi et al. ............ 714/769 |
| 7,075,877 B2 * | 7/2006 | Ando et al. .............. 369/59.25 |
| 2004/0027980 A1 * | 2/2004 | Sako et al. ................ 369/272 |
| 2004/0120236 A1 * | 6/2004 | Suzuki et al. .............. 369/52.1 |

* cited by examiner

*Primary Examiner*—Wayne R Young
*Assistant Examiner*—Adam R Giesy
(74) *Attorney, Agent, or Firm*—Hamilton & Terrile, LLP; Robert W. Holland

(57) ABSTRACT

Separate sets of optical medium identification information are embedded in separate aligned layers of the optical medium to allow an optical drive to initiate use of the optical medium with information from both layers. For instance, a first set of identification information is embedded in the data layer of the optical medium and a second set of identification information is embedded on the protective surface layer of the optical medium. The first and second sets of information align so that a mixed signal is provided when the optical medium is initially inserted in the optical drive with the optical drive reading the separate sets of information while the read head is at a single location.

20 Claims, 3 Drawing Sheets

OPTICAL MEDIUM ALIGNED INFORMATION SYSTEM AND METHOD

BACKGROUND OF THE INVENTION

1. Field of the Invention

The present invention relates in general to the field of information storage, and more particularly to aligned information areas of an optical storage medium.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have become more common and have improved in the speed at which the process information, increasing amounts of information have been generated for storage. Optical media provide a sensible and relatively inexpensive solution for storing large quantities of information on a portable material. Generally, an optical medium stores information by altering the reflective qualities of a data layer material directly with recordable media, or indirectly by the creation of a master for stamped media, with a focused laser and allows retrieval of information by reflection of a focused laser against the altered material to measure the reflected light characteristics. However, the precise characteristics of optical media vary widely to accommodate different storage speeds, densities and functions. Optical media materials have developed from supporting relatively simple CD-R discs that write data only once for each area to more complex materials that support rewritable CD-RW discs with repeated writing of data over the same areas of a medium. Storage densities have increased from less than a gigabyte with infrared laser CD formats to several gigabytes with red laser writable and re-writable DVD formats, and even greater densities with planned blue laser media. Optical drives typically manage writes to different types of optical media by reading and applying information embedded on an optical medium, such as information embedded according to PEP standard of ISO/ANSI. Embedded information is generally stored at the inner portion of an optical medium so that an optical disc drive pickup unit can quickly find the embedded information. For instance, optical disc drives find embedded information using a reference point, such as by its relationship to a "crash stop" position, which is generally the closest possible position of the pickup unit to the center spindle of the optical medium.

One difficulty with the management of different types of optical media is that the embedded information generally must be readable when a medium is inserted into an optical drive. Accurate assessment of the embedded information is generally necessary at start up of the optical medium in an optical drive so that the embedded information is readable before further use of the optical medium. In some instances, embedded information is stored in the information area of an optical medium, for instance, permanently incorporated by stamping of the embedded information in the data layer of blank optical medium during manufacture. Embedding information in this manner helps to protect the embedded information from damage since embedded information written to the data layer is covered by a protective coat layer disposed over the data layer. However, embedding information in the data layer inhibits production flexibility since each optical medium of a given production set generally must have the same embedded information. An alternative manner of embedding information is to laser cut or ink mark a finalized optical medium's outer protective coat with the embedded information. This manner of embedding information generally provides greater flexibility since each optical medium may be individually printed upon with relative ease. However, print on the outer protective coat of an optical medium is more susceptible to damage and generally obscures due to the necessary size of the marks any information stored beneath, such as stamped information.

SUMMARY OF THE INVENTION

Therefore a need has arisen for a system and method which embeds separate sets of aligned information on an optical medium that are each readable by an optical drive at start up of an optical drive read of the optical medium.

In accordance with the present invention, a method and system are provided for embedding information on an optical medium. First and second separate sets of information are embedded on different layers of an optical medium aligned at a fixed reference point that allows an optical drive to read both sets of information on an initiation of the optical medium in the optical drive.

More specifically, a first set of identification information is embedded in the data layer of an optical medium and a second set of identification information is embedded on a different layer of the optical medium, such as the protective layer, with both sets of information aligned vertically at substantially the same radius of the optical drive so that the optical drive is able to quickly read both sets of information during initiation of the optical medium in the optical drive. An identification module associated with the optical drive separates the first and second sets of information based on the relative position of the information about the circumference of the optical medium or the encoding of the first and second sets of information. For instance, the first set of information is stamped in the data layer in eight repeated portions disposed about the circumference and the second set of information is ink marked on the protective surface layer over the first set of information for a part of the circumference so that at least one complete portion of the first set of information is not covered. Alternatively, the first and second sets of information are encoded to provide a mixed signal that allows identification of each set of information, such as with frequency modulation, phase encoding or bar coding. In another alternative embodiment, the first and second sets of information are embedded with various widths that allow alterations in the focus of the optical drive laser to separately read the individual layers.

The present invention provides a number of important technical advantages. One example of an important technical advantage is that separately identifiable sets of information are embedded in different aligned layers of an optical medium. Embedding a first set of information in the data layer, such as during stamping of an optical medium for manufacture, reduces the risk of damage to embedded information that is substantially similar or identical across a number of discs. Embedding the second set of information in the outer protective layer, such as with ink marking or laser cutting after manufacture of the optical medium, provides increased flexibility to individually identify each optical medium. Separate sets of embedded information improve optical medium disc identification as the number and types of optical media increase, such as with the introduction of blue laser optical drive systems.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Plural separate sets of embedded identification information are read by an optical drive of an information handling system from separate aligned areas of an optical medium at initiation of the optical drive after insertion of the optical medium. A first set of information embedded in the data layer of the optical medium is readable under a second set of information embedded in the protective layer of the optical medium to allow the embedding of information at separate points in manufacture of the optical medium. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
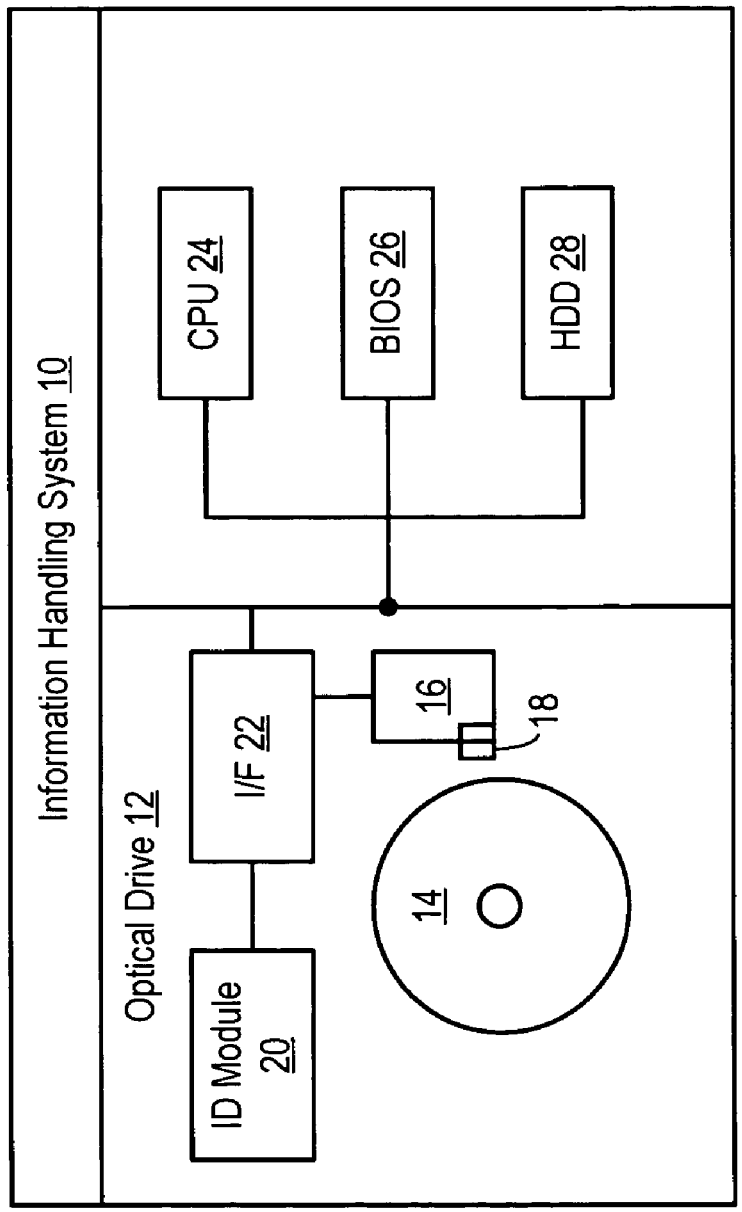
FIG. 1 depicts a block diagram of an information handling system having an optical drive operable to read aligned embedded information sets.

Referring now to FIG. 1, a block diagram depicts an information handling system 10 having an optical drive 12 that reads plural sets of aligned identification information from an optical medium 14 with a pick-up read head 16 and associated laser 18. Optical drive 12 applies identification information determined by an identification module 20 to determine media related information from optical medium 14 that is received through interface 22 from processing components of information handling system 10, such as CPU 24, BIOS 26 and hard disc drive 28. The use of plural sets of aligned identification information on optical medium 14 allows an optical medium manufacturer to embed a first set of information into the data layer of optical medium 14 and embed a separate and distinct second set of information on a second layer, such as the protective surface layer of optical medium 14. Aligning the two sets of information at a predetermined radius, such as radius determinable from the crash stop position of pick-up read head 16, allows each set of information to be quickly addressed by pick-up read head 16. Both sets of information are thus accessible to identification module 20 on initial insertion of optical medium 14 into optical drive 12 whether or not the actual location of the focused spot of laser 18 relative to the data area of optical medium 14 is established.

Figure 2:
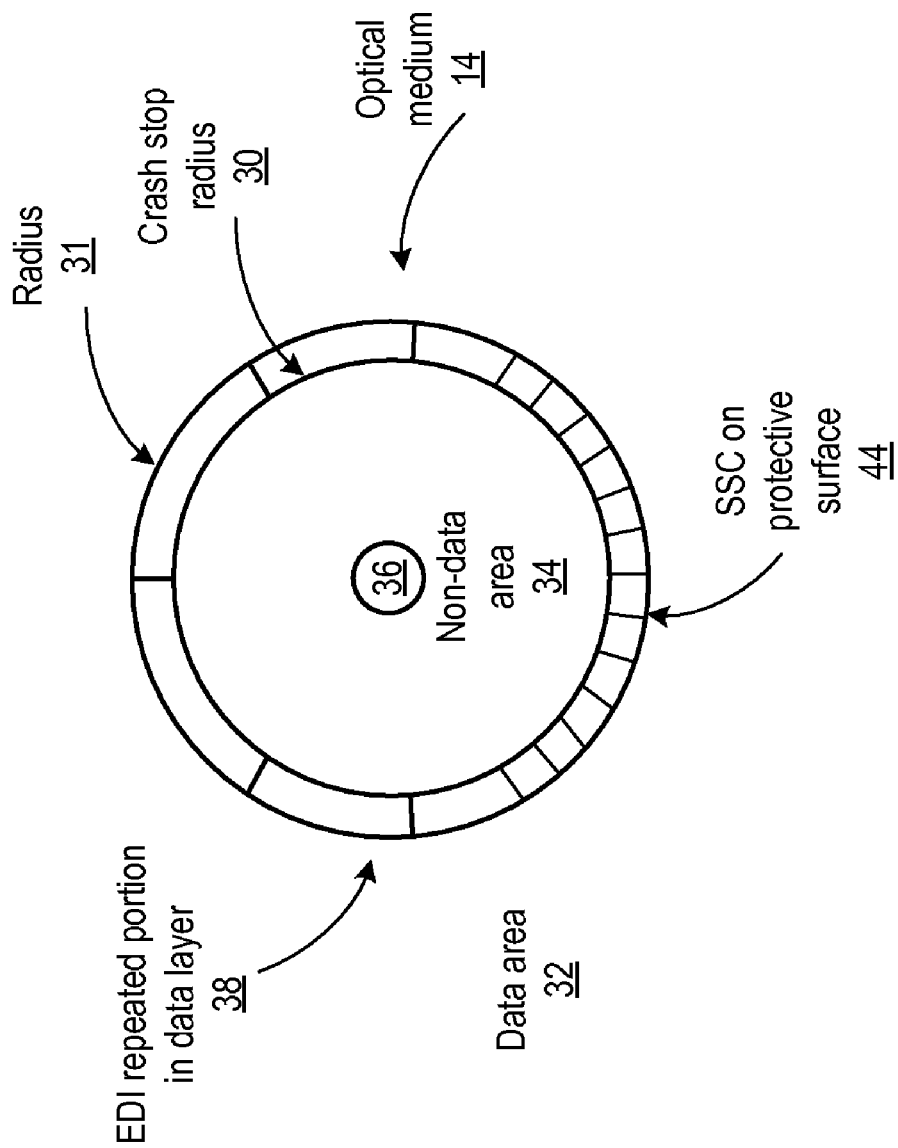
FIG. 2 depicts a close view of the inner radius of an optical medium having aligned embedded information sets.
Figure 3:
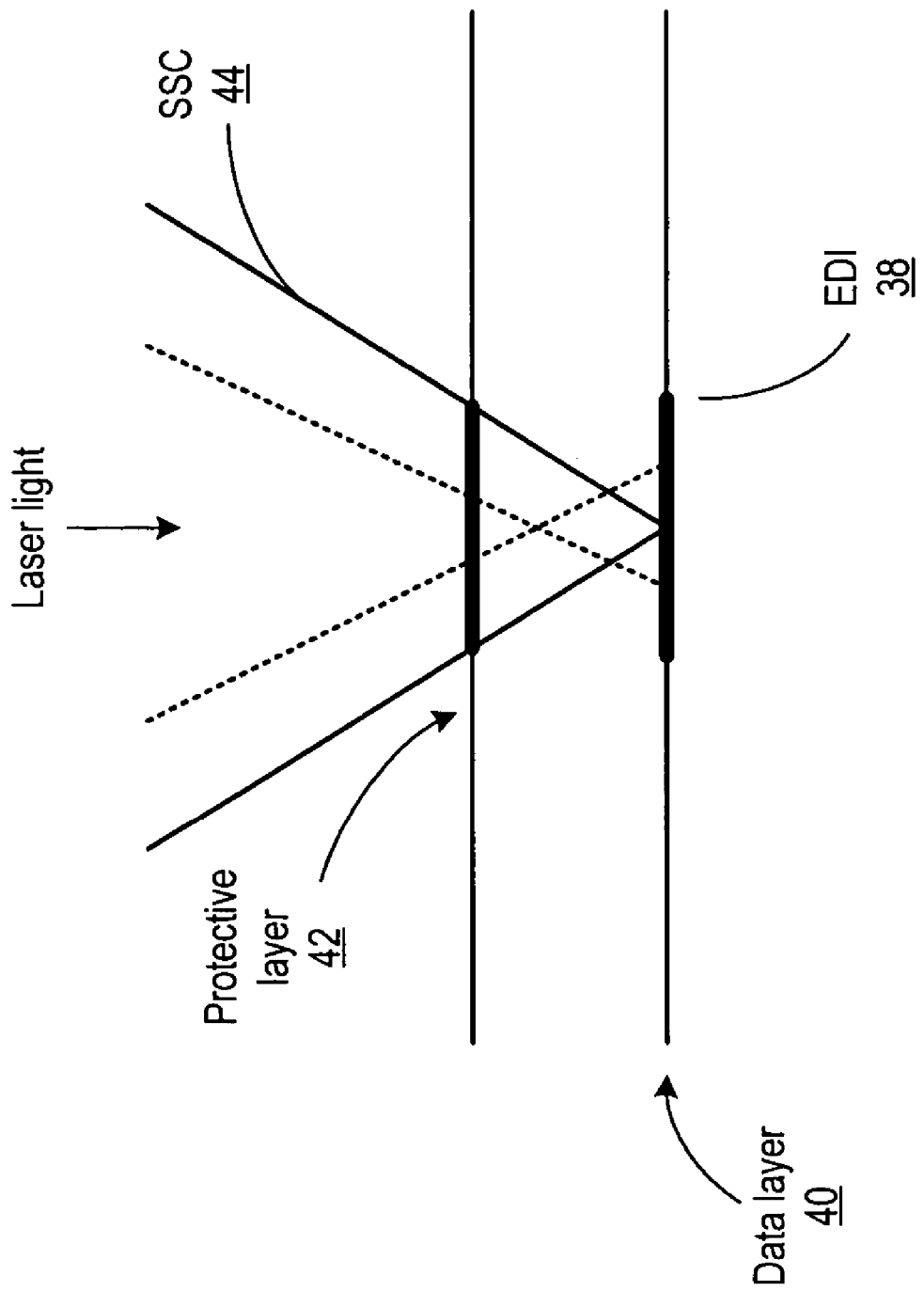
FIG. 3 depicts a cutaway view of an optical medium having embedded information on a protective layer aligned over embedded information of a data layer.

Referring now to FIG. 2, a top view of the inner portion of optical medium 14 depicts one embodiment of aligned first and second information areas for embedding identification information within the area defined between radius 30 and radius 31. The embedded information area between radius 30 and radius 31 is near the inner-most perimeter of data area 32 and located by reference to a fixed point at or near which an optical head initiates a read from optical medium 14. A non-data area 34 inside of radius 30 buffers a center hole 36 through which an optical drive disc spindle fits upon insertion of optical medium 14 into an optical drive 12. A first set of embedded disc information (EDI) 38 is stored about the circumference of optical medium 14 in the data layer 40, as depicted by FIG. 3, within radius 30 and radius 31. The EDI information is repeated in eight subsets with each subset having a full set of identification information and is embedded in the data layer 40, such as during stamping of the optical medium. The second set of information 44 is recorded on a second layer of optical medium 14, such as the outside surface of protective layer 42, and aligned with the first set of EDI information within radius 30 and radius 31. The second layer information is disposed over less than the full circumference of optical medium 14, such as a third or less of the circumference so that at least one complete subset of EDI information is not covered by the second layer information. For instance, the second layer information is laser cut or ink marked at the protective layer surface. In this manner, when optical medium 14 is first inserted into optical drive 12, pick-up read head 16 proceeds to a predetermined position within radii 30 and 31 to read both the EDI and second layer sets of information. The EDI information is consistent for all optical media stamped with a given manufacturing process while the second layer information may be individualized for each optical medium.

In alternative embodiments, separate sets of aligned information embedded in different layers of an optical medium are read separately by an optical drive by distinguishing the sets of information with various modulation codes or embedding patterns. For instance, in one embodiment, the first and second sets of information are read as a mixed signal by optical drive 12 and the mixed signal is separated in identification module 20 to provide both the EDI and second layer information for identifying the optical medium. To produce a desired mixed signal, the data layer information area 40 and second layer information area 44 are encoded with fundamentally different basic encoding to allow identification of each by their reflective signal properties rather than the focused beam 46 position of the laser spot, as depicted by FIG. 3. For instance, an out-of-focus beam 48 between data layer 40 and protective layer 42 results in reflections of substantially similar quality from each layer. Encoding with one or a combination of bar code, frequency modulation or phase encoding for each set of information outputs a mixed signal that is decipherable by identification module 20. As another example, the widths of the EDI and second layer information areas relative to each other are defined so that a laser spot reads around the second layer information to detect the EDI layer to allow continuity of the EDI information about the circumference of optical medium 14. At a predetermined radius, the EDI and second layer information sets are read by altering the focus point of the laser between the surface and data layers. Various combinations of mixed signal and varying coverage of the second layer information, either in width or in percent of circumference, provide additional assurance that both EDI and second layer information will be available at initial read of optical medium 14.

Although the present invention has been described in detail, it should be understood that various changes, substitutions and alterations can be made hereto without departing from the spirit and scope of the invention as defined by the appended claims.

What is claimed is:

1. An optical medium disc for storing information readable by an optical disc drive, the optical medium disc comprising:
   a first layer having reflective properties, the first layer operable to store information through manipulation of the reflective properties by a laser;
   a second layer disposed over the first layer;
   a first set of embedded information stored at the first layer within a first range of radii of the optical medium; and
   a second set of embedded information stored at the second layer aligned to substantially overlap the first set of information.

2. The optical medium disc of claim 1 having data and protective layers, wherein the first set of embedded information comprises plural repeated subsets distributed around the entire circumference of the optical medium disc in a data layer, and the second set of embedded information is distributed over the first set of embedded information around a portion of the circumference of the optical medium disc at the protective layer so that at least one complete subset of the first set of embedded information remains uncovered by the second set of embedded information.

3. The optical medium disc of claim 2 wherein the first set of embedded information comprises eight repeated subsets distributed around the entire circumference of the optical medium disc and the second set of embedded information is distributed over less than one third of the circumference of the optical medium disc.

4. The optical medium disc of claim 2 wherein the second set of embedded information comprises ink marking over the protective layer.

5. The optical medium disc of claim 2 wherein the second set of embedded information comprises laser cutting over the protective layer.

6. The optical medium disc of claim 1 wherein the first set of embedded information comprises a first encoding and the second set of embedded information comprises a second encoding, the first and second sets of information operable to provide a mixed signal to an optical disc drive.

7. The optical medium of claim 6 wherein the mixed signal comprises frequency modulation operable to distinguish between the first and second sets of embedded information.

8. The optical medium of claim 6 wherein the mixed signal comprises phase encoding operable to distinguish between the first and second sets of embedded information.

9. The optical medium of claim 6 wherein the mixed signal comprises bar coding operable to distinguish between the first and second sets of embedded information.

10. The optical medium of claim 1 wherein the first set of embedded information has first width and the second set of information has a second width so that first set of embedded information is readable under the second set of embedded information.

11. A method for embedding information in an optical medium having plural layers, the method comprising:
    embedding a first set of information in a first layer at a predetermined radius of the optical medium;
    embedding a second set of information in a second layer at the predetermined radius of the optical medium;
    inserting the optical medium in an optical medium drive; and
    initiating the optical drive to use the optical medium by bringing the optical drive read head to the predetermined radius and reading the first and second sets of information.

12. The method of claim 11 wherein:
    embedding the first set of information further comprises storing the first set of information as plural repeated subsets around the circumference of the optical medium at the predetermined radius; and
    embedding the second set of information further comprises storing the second set of information substantially aligned to cover the first set of information over part of the circumference of the optical medium so that at least one of the repeated subsets of the first set of information remains uncovered.

13. The method of claim 12 wherein the first set of information comprises eight plural repeated subsets and the second set of information covers one third or less of the first set of information.

14. The method of claim 11 wherein embedding the first set of information further comprises stamping the first set of information into a data layer.

15. The method of claim 14 wherein embedding the second set of information further comprises ink marking the second set of information onto the protective outer surface of the optical medium as one or plural subsets.

16. The method of claim 11 wherein the first and second set of information are modulation coded to output a mixed signal.

17. An information handling system comprising:
    components operable to generate information for storage on an optical medium;
    an optical drive interfaced with the components and operable to accept the information for storage on the optical medium;
    a pick-up head associated with the optical drive and operable to read reflected laser light from the optical medium; and
    an optical media identification module interfaced with the pickup head and operable to determine identification information read from first and second aligned embedded information areas, the first embedded information area in a first layer of the optical medium, the second embedded information area in a second layer of the optical medium.

18. The information handling system of claim 17 wherein the first embedded information area comprises a data layer between first and second radii and the second embedded information area comprises a protective layer between the first and second radii.

19. The information handling system of claim 18 wherein the first and second aligned embedded information areas output a frequency modulated mixed signal that the optical media identification module demodulates to read first and second embedded identification information sets.

20. The information handling system of claim 18 wherein the first and second aligned embedded information areas output a phase encoded mixed signal that the optical media identification module demodulates to read first and second embedded identification information sets.

* * * * *

UNITED STATES PATENT AND TRADEMARK OFFICE
CERTIFICATE OF CORRECTION

PATENT NO. : 7,596,069 B2 Page 1 of 1
APPLICATION NO. : 10/722268
DATED : September 29, 2009
INVENTOR(S) : Steenbergen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1462 days.

Signed and Sealed this

Twenty-eighth Day of September, 2010

David J. Kappos
*Director of the United States Patent and Trademark Office*